United States Patent [19]

Myers

[11] 4,320,466
[45] Mar. 16, 1982

[54] ADDRESS SEQUENCE MECHANISM FOR REORDERING DATA CONTINUOUSLY OVER SOME INTERVAL USING A SINGLE MEMORY STRUCTURE

[75] Inventor: Dewey R. Myers, Plano, Tex.

[73] Assignee: Texas Instruments Incorporated, Dallas, Tex.

[21] Appl. No.: 88,742

[22] Filed: Oct. 26, 1979

[51] Int. Cl.³ .............................................. G06F 9/32
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,372,382 | 3/1968 | Newman | 364/200 |
| 3,629,857 | 12/1971 | Faber | 364/200 |
| 4,087,626 | 5/1978 | Brader | 364/900 |
| 4,095,266 | 6/1978 | Carubia et al. | 364/200 |

Primary Examiner—Harvey E. Springborn
Attorney, Agent, or Firm—Rene' E. Grossman; Melvin Sharp; James T. Comfort

[57] ABSTRACT

A signal processor has a single random access memory having a capacity equal to or greater than the total number of words in a processing interval. An address sequence mechanism is operatively connected to the memory for addressing the memory in a sequence for, after the first processing interval, reading out data for the first processing interval continuously in a preselected output order and overwriting data for the next processing interval continuously in a preselected input order in the locations of the data being read out. An address checker is connected to the address sequence mechanism for checking the addresses thereof for error and a controller is operatively connected to the address sequence mechanism, address checker, and memory for controlling their operation.

8 Claims, 5 Drawing Figures

ADDRESS SEQUENCE MECHANISM FOR REORDERING DATA CONTINUOUSLY OVER SOME INTERVAL USING A SINGLE MEMORY STRUCTURE

This invention relates to signal processing equipment and more particularly to an address sequence mechanism.

The utilization of this invention can best be described in a radar system. It will be appreciated the use of a radar system is by way of application and not by way of limitation. The radar system used in the description is one suitable for air to ground operation in the coherent mode for target search, acquisition and track. The radar, such as that disclosed by L. J. Cutrano, et al. in: "A High Resolution Radar Combat—Surveillance System," IRE TRANS., Vol. Mil. 5, pp. 127-131, April 1961, comprises: an antenna connected to a motion sensing system, a coherent transmitter and receiver connected to the antenna, a coherent detector connected to the receiver, a video digitizer unit connected to the coherent detector, a coherent processing interval memory unit connected to the video digitizing unit, a coherent integrator connected to the coherent processing interval memory, a display video signal processor connected to the coherent integrator, and a display connected to the display video signal processor.

The radar system, as it moves along the line of flight, transmits pulses at the pulse repetition frequency (PRF) and preselected squint angles, toward a preselected point to be mapped and collects returns during the pulse repetition intervals (PRI's). The motion sensing system senses system vibration and instantaneous changes in motion to accurately point the antenna. The receiver, of the coherent radar system, is a double conversion receiver. It has feed forward gain control and azimuth and elevation monopulse. It has two receiver channels (sum and difference at the IF) with elevation and azimuth signals time sharing one channel. For ground mapping, the operation of the receiver is delayed to provide a plurality of range intervals for each pulse over the area to be mapped.

The coherent detector detects this video and feeds it down to baseband video where a sum I (in phase) signal and a sum Q (quadrature) signal are produced together with a difference I signal and a difference Q signal.

The video digitizer unit captures the data in range using a range stabilized clock at a very fast rate. For example, the rate may be 20 megahertz (mHz) to provide about ten meter resolution. This rate would impose a severe burden on the coherent processing interval memory; thus, a slower clock rate is required. Thus the video digitizing unit has buffer memories and the data at the high rate (20 mHz) is written into the buffer memories and read out at the lower rate.

The coherent processing interval memory unit receives the range data continuously for each processing interval in an input order and reads it out in an output order. The input order is the row or Y, X order in which each pulse repetition interval (PRI) (Y) is addressed and data for each range bin (X) is collected. The output order is the column or X, Y order in which each range bin (X) is addressed and data for each PRI (Y) is read out. In the past, the coherent processing interval memory has been implemented as a double buffer memory. Each memory had a capacity equal to one processing interval. The first memory was used to store the data for the first processing interval and the second memory was then used to store the data for the second processing interval. During the time the second memory was storing the data for the second processing interval, the data for the first processing interval was read out in the output order. Then, while data for the second processing interval was being read out, data for the third processing interval was being stored into the first memory. This cycle was repeated continuously for the entire radar operation.

The coherent integrator receives the output of the coherent processing interval memory and performs fast fourier transforms on the doppler (I and Q) signals for each range bin.

The display video signal processor then converts the frequency information for each range bin into video signals, and the display then displays the video signals. The result is that a plurality of targets, which would have been detected by the real beam as a single target, are detected correctly as a plurality of targets because of the higher resolution.

The problem with the coherent processing interval memory is that double memory capacity is required. This contributes substantially to the size, weight, power, cost and reliability of the radar system or any other data system in which data is written into a memory continuously in an input order and read out in an output order which differs from the input order.

Accordingly, it is an object of this invention to provide a simplified data storage system for the continuous storage of incoming data into a single memory in an input order and continuously reading out the data in an output order, which differs from the input order, for processing.

Another object of the invention is to provide a data storage system having a single memory of a capacity equal to the total number of words in a processing interval.

Briefly stated the signal processor comprises a random access memory having a given number of word locations, an address sequence mechanism (address means) for after the first input interval, continuously reading out the data in an output order and continuously writing data into the memory locations vacated during read out in an input order which differs from the read out order. This technique is referred to as "overwriting."

The novel features believed to be characteristic of the invention are set forth in the appended claims. The invention itself, however, as well as other objects and advantages thereof may best be understood by reference to the following detailed description of an illustrative embodiment when read in conjunction with the accompanying drawings in which:

Figure 1:
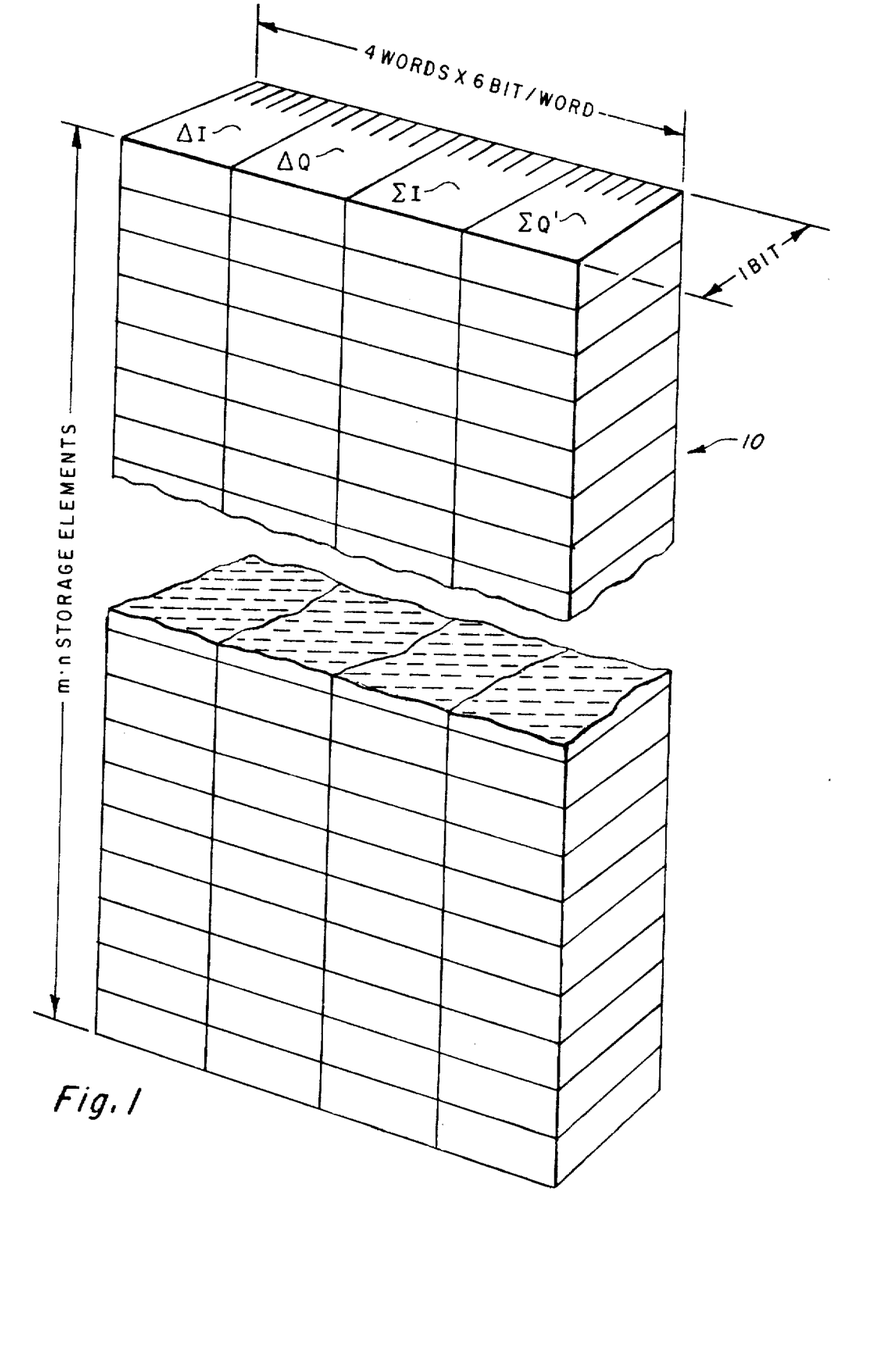
FIG. 1 is an isometric view of the random access memory.
Figure 2:
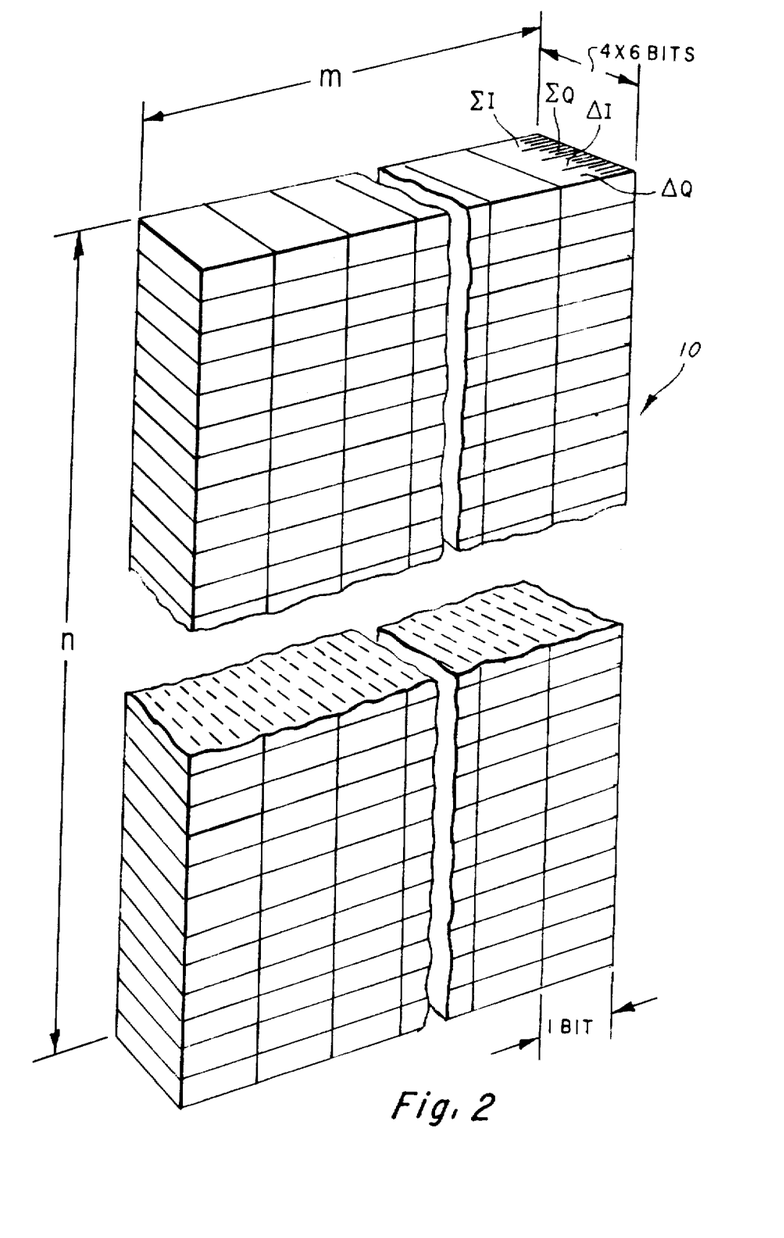
FIG. 2 is a pictorial representation of the organization of the data stored for each coherent processing interval.

Referring now to FIG. 1 in which is shown, for example, a four six bit word, linear random access memory 10. The memory has twenty four bits width and at least (m·n) addresses to accommodate for our radar example the range information (m range bins) obtained from n pulse repetition intervals (PRI's). For a clearer understanding of the data sequencing function the concept "data array" is introduced (FIG. 2). The "data array" is only a conceptual tool to visualize the sequencing function hereinafter described and is not physically implemented. The data array (FIG. 2) for each coherent processing interval (the area to be mapped) is divided into range bins of (X) columns and (Y) PRI rows with each bin having 24 bits; i.e., four times the number of bits in each word (six). Thus the number of range bins ($X_m$) multiplied by the number of PRI's ($Y_n$) constitutes one processing interval and the number of data locations required in the memory. The four six bit words are the output of the radar's video digitizer unit. The video digitizer unit digitizes the analog return signals for the four channels ($\Sigma I$, $\Sigma Q$, $\Delta I$, $\Delta Q$) and provides six bit words, for example, representative of the amplitude of the sampled signals. For practical applications, the memory consists, for example, of a plurality of 16K dynamic RAM IC's 16K dynamic RAM's may be, for example, TMS4116's sold by Texas Instruments Incorporated.

Data is written into the memory 10 (FIG. 1) in accordance with an input order (FIG. 2) as follows: $Y_1(X_1 - - - X_m)$, $Y_2(X_1 - - - X_m) - - -$, $Y_n(X_1 - - - X_m)$; and is read out in an output order as follows: $X_1(Y_1 - - - Y_n)$, $X_2(Y_1 - - - Y_n)$, $- - -$, $X_m(Y_1 - - - Y_n)$. Y is used to represent PRI's and X is used to represent range bins.

Figure 3:
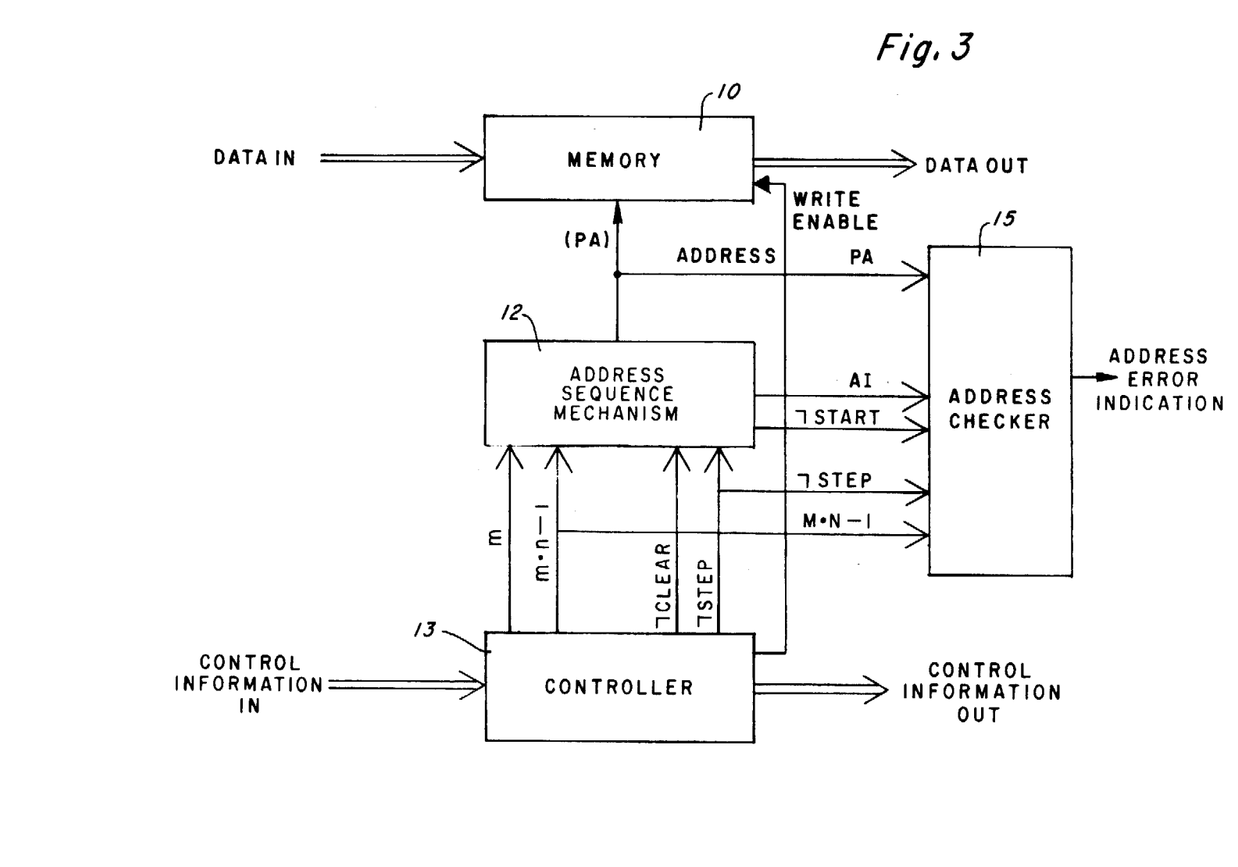
FIG. 3 is a high level block diagram of the signal processor.

The memory 10, as shown in FIG. 3, is addressed by a data address sequence mechanism 12, which is controlled by controller 13 to provide sequence addresses from a start address (SA) to address $SA+m\cdot n-1$ for each processing interval. Each address is checked by address checker 15. As only one memory structure is used, the information is continuously read out in an output order and overwritten in an input order. This mode of operation is continued for each processing interval.

It will be shown by illustration that the address sequence mechanism is to generate the following addressing equations in order to accomplish the desired reordering of the data $ADD_{K+1} = ADD_K + AI_J$
If $ADD_K + AI_J > SA + m\cdot n - 1$
Then $ADD_{K+1} = ADD_K + AI - (m\cdot n - 1)$
Where
$ADD_K$ = Present address
$ADD_{K+1}$ = Calculated next address
SA = Memory start address
m = Number of range bins
n = Number of PRI's
$AI_J$ = Address increment for the present AI
$AI_{J+1}$ = Address increment for the next PI The address increment for the next PI ($AI_{J+1}$) can be calculated from the present AI ($AI_J$) as follows:

$$AI = (PAI \cdot m) - \left( \text{Integer of } \frac{PAI \cdot m}{m \cdot n - 1} \right) (m \cdot n - 1)$$

It will be shown by illustration that $AI_{J+1}$ can be determined dynamically during the operation of the address sequence mechanism without resorting to the calculation of the above equation.

It will also be shown by illustration that the address increment follows an orderly sequence and eventually repeats.

It will also be evident that if the first data of the data array is stored in address SA then the last data of the data array will be stored in address $SA+m\cdot n-1$.

In order to maintain the output order, the addresses for each coherent processing interval (PI), after the addresses for the first PI which are incremented by 1, are incremented in accordance with the above mentioned formula.

It will be appreciated that, for brevity and clarity of the description of the invention, a 256,000 address sequence cannot be utilized. Therefore, the principle of the invention can best be illustrated from a small memory. Thus, for purposes of description only, we will assume 2 range bins, and three PRI's, and a corresponding 0 to 5 element 4×6 bit memory. In a 2 by 3 array, the data format locations (DFL) from which the six bit data words are obtained are designated 11, 21, 12, 22, 13 and 23, as shown in TABLE 1.

TABLE 1

|     | $m_1$ | $m_2$ |       |
| --- | ----- | ----- | ----- |
|     | 11    | 21    | $n_1$ |
|     | 12    | 22    | $n_2$ |
|     | 13    | 23    | $n_3$ |

The memory locations are designated by the numbers 0 through 5 in TABLE 2.

TABLE 2

| (MEMORY) | |
| --- | --- |
| LOCATIONS | |
| 4 × 6 Bits | 0 |
| " | 1 |
| " | 2 |
| " | 3 |
| " | 4 |
| " | 5 |

Thus, the input order is as shown in TABLE 3.

TABLE 3

(INPUT ORDER)

The data is always read out of the memory locations in the output order shown in TABLE 4.

TABLE 4
(OUTPUT ORDER)

During start up, or processing interval (PI$_{-1}$), the memory is filled with meaningless information. At (PI$_0$) the memory locations are addressed by an address sequence in which each address, beginning with the start address (SA) is incremented by 1, and the information from the data format locations is stored in memory locations as shown in TABLE 5.

TABLE 5

| INPUT | MEMORY | | ADDRESS |
|---|---|---|---|
| 11 → | 11 | 0 | SA + 0 |
| 21 → | 21 | 1 | SA + 1 |
| 12 → | 12 | 2 | SA + 2 |
| 22 → | 22 | 3 | SA + 3 |
| 13 → | 13 | 4 | SA + 4 |
| 23 → | 23 | 5 | SA + 5 |

During the second processing interval (PI$_1$), the addresses beginning after SA are incremented by two. The increment is derived from the formula as follows:

$$AI = PAI \cdot m - \left( \text{Integer of } \frac{PAI \cdot m}{m \cdot n - 1} \right).$$

$$(m \cdot n - 1) = 1 \cdot 2 - (0) \cdot 5 = 2 = AI.$$

The data in the memory for PI$_0$ are read out of the memory locations in the output order and the data for PI$_1$ are written into these memory locations in the input order. TABLE 6 shows the results of the processing interval PI$_1$.

TABLE 6
DATA INPUT  MEMORY  ADDRESS  DATA OUTPUT

TABLE 6-continued

Thus at SA+0 data for data format location (DFL) 11 is read out of memory location 0 and new data for DFL 11 is overwritten in;

at SA+2 data for DFL 12 is read out of memory location 2 and new data for DFL 21 is overwritten in;

at SA+4 data for DFL 13 is read out of memory location 4 and new data for DFL 12 is overwritten in;

at SA+1 data for DFL 21 is read out of memory location 1 and new data for DFL 22 is overwritten in;

at SA+3 data for DFL 22 is read out of memory location 3 and new data for DFL 13 overwritten in;

and at SA+5 data for DFL 23 is read out of memory location 5 and new data for DFL 23 is read in.

During the third processing interval PI$_2$, the addresses beginning after SA are incremented by four (4), which is figured from the formula as follows:

$$AI = PAI \cdot m - \left( \text{Integer of } \frac{PAI \cdot m}{m \cdot n - 1} \right)$$

$$(m \cdot n - 1) = 2 \cdot 2 - (0) \cdot 5 = 4 = AI.$$

The data in the memory for PI$_1$ are read out in the output order and data for PI$_2$ are written into the memory in the input order. TABLE 7 shows the results of the processing interval PI$_2$.

TABLE 7

| DATA INPUT | MEMORY | DATA OUTPUT |
|---|---|---|

Thus, at SA 0 data for DFL 11 is read out of memory location 0 and new data for DFL 11 is overwritten in;

at SA+4 data for DFL 12 is read out of memory location 4 and new data for DFL 21 is overwritten in;

at SA+3 data for DFL 13 is read out of memory location 3 and new data for DFL 12 is read in;

at SA+2 data for DFL 21 is read out of memory location 2 and new data for DFL 22 read in;

at SA+1 data for DFL 22 is read out of memory location 1 and new data for DFL 13 is overwritten in; and at SA+5 data for DFL 23 is read out of memory location 5 and new data for DFL 23 is overwritten in.

During the fourth processing inverval PI₃ the addresses beginning after SA are incremented by three (3), which is figured from the formula as follows:

$$AI = PAI \cdot m \left( \text{Integer of } \frac{PAI \cdot m}{m \cdot n - 1} \right)$$

$$(m \cdot n - 1) = 4 \cdot 2 - 1 \cdot 5 = 8 - 5 = 3 = AI.$$

The data in the memory for PI₂ are read out in the output order and PI₃ data are written into the memory in the input order. TABLE 8 shows the results of the processing interval PI₃

TABLE 8

DATA INPUT    MEMORY    DATA OUTPUT

| IN | OUT | | |
|---|---|---|---|
| 11 | 11 | 0 | SA + 0 → 11 |
| 12 | 13 | 1 | SA + 1 → 12 |
| 13 | 22 | 2 | SA + 2 → 13 |
| 21 | 12 | 3 | SA + 3 → 21 |
| 22 | 21 | 4 | SA + 4 → 22 |
| 23 | 23 | 5 | SA + 5 → 23 |

Thus, at SA+0 data for DFL 11 is read out of memory location 0 and new data for DFL 11 is overwritten in;

at SA+3 data for DFL 12 is read out of memory location 3 and data for DFL 21 overwritten in;

at SA+1 data for DFL 13 is read out of memory location 1 and data for DFL 12 overwritten in;

at SA+4 data for DFL 21 is read out of memory location 4 and data for DFL 22 is overwritten in;

at SA+2 data for DFL 22 is read out of memory location 2 and new data for DFL 13 is overwritten in; and at SA+5 data for DFL 23 is read out of memory location 5 and new data for DFL 23 overwritten in.

Finally, during the fifth processing interval PI₄ the addresses beginning after SA is incremented by one (1), i.e.

$$AI = PAI \cdot m - \left( \text{Integer of } \frac{PAI \cdot m}{m \cdot n - 1} \right)$$

$$(m \cdot n - 1) = 3 \cdot 2 - 1 \cdot 5 = 6 - 5 = 1 = AI.$$

The data in the memory for PI₃ are read out in the output order and PI₄ data are written in to the memory in the input order. TABLE 9 shows the results of processing interval PI₄.

TABLE 9

DATA INPUT    MEMORY    DATA OUTPUT

TABLE 9-continued

| IN | OUT | | |
|---|---|---|---|
| 11 | 11 | 0 | SA + 0 → 11 |
| 21 | 12 | 1 | SA + 1 → 12 |
| 12 | 13 | 2 | SA + 2 → 13 |
| 22 | 21 | 3 | SA + 3 → 21 |
| 13 | 22 | 4 | SA + 4 → 22 |
| 23 | 23 | 5 | SA + 5 → 23 |

Thus, at SA+0 data for DFL 11 is read out of memory location 0 and new data for DFL 11 is overwritten in;

at SA+1, data for DFL 12 is read out of memory location 1 and new data for DFL 21 is read in;

at SA+2 data for DFL 13 is read out of memory location 2 and data for DFL 12 is overwritten in;

at SA+3 data for DFL 21 is read out of memory location 3 and new data for DFL 22 is overwritten in;

at SA+4 data for DFL 22 is read out of memory location 4 and new data for DFL 13 is read in; and at SA+5 data for DFL 23 is read out of memory location 5 and new data for DFL 23 is overwritten in. It will be noted that with processing interval PI₄ the incrementing cycle for the processing intervals has begun to repeat itself.

From the tables (5-8) one will note that at the beginning cycle (Table 5) the data is entered in the input order and at the end cycle (Table 8) the data is entered in the output order. Further, it will be noted from the Tables 5-8 that each cycle begins with the start address entering the 11 data in the zero position of the memory and ends with the final address entering the 23 data in the five or last position of the memory. Finally, it will be noted from Tables 5-8 that memory location where the DFL 12 data is written minus the start address is the AI for the next PI.

Figure 4:
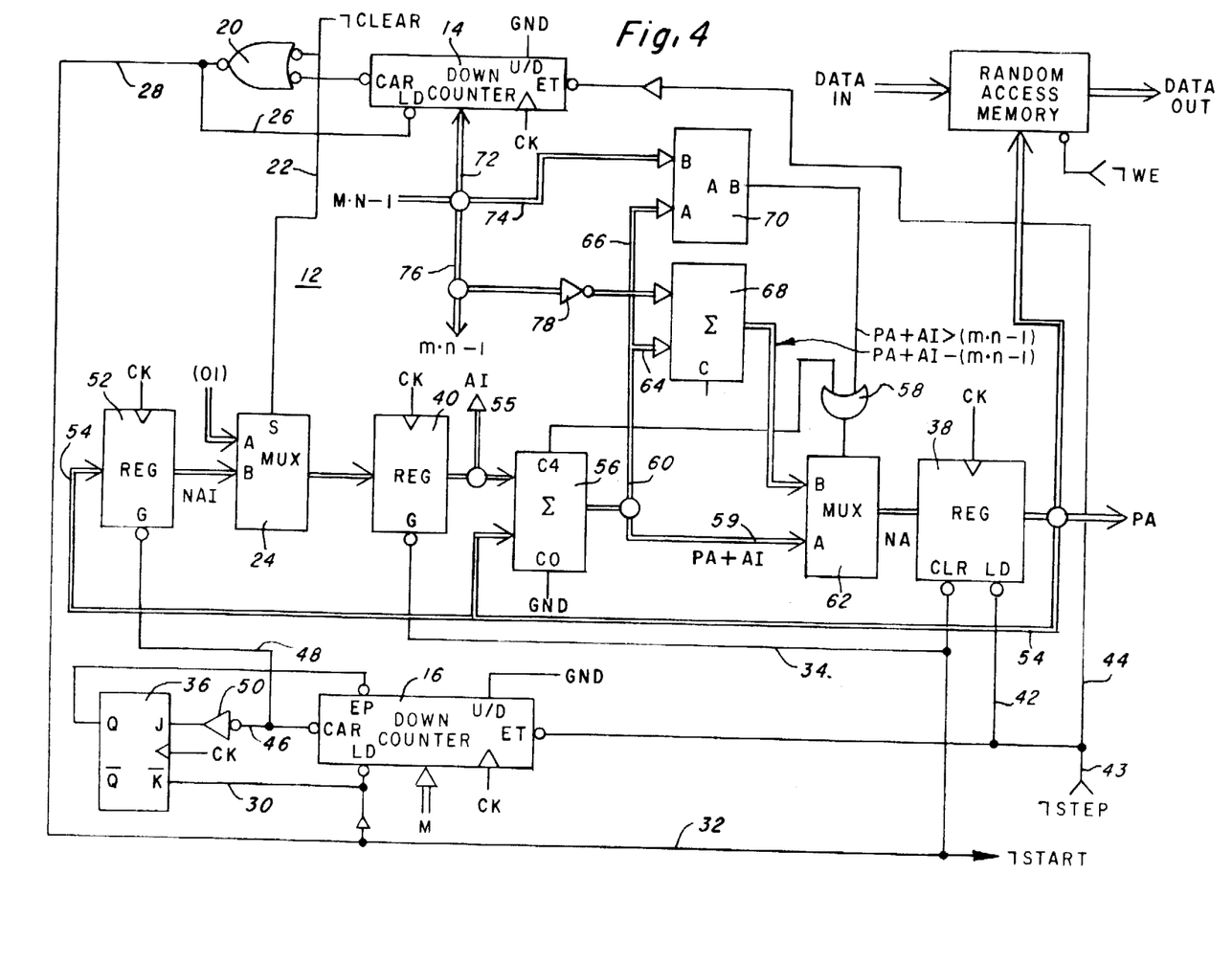
FIG. 4 is a block diagram showing the address sequence mechanism with the random access memory.

Referring now to FIG. 4, the address sequence mechanism 12 (FIG. 3) providing the above described memory 10 location addresses comprises a first counter 14 (FIG. 4) for indicating the beginning of the processing intervals (PI) and a second counter 16 for signaling the address increment (AI) for the next PI. The counters may be, for example, SN74LS169 counters sold by Texas Instruments Incorporated. The counter 14 receives from controller 13 (FIG. 3) a binary number equal to m·n−1 at its data in terminals. The m·n−1 count is decremented to zero and provides an output pulse at its carry output terminal. The counter's carry output terminal is connected to an input terminal of AND gate 20 (FIG. 3). The other input terminal of AND gate 20 is connected by lead 22 to the S terminal of multiplexer 24 and to a clear output terminal of controller 13 (FIG. 3). The output of AND gate 20 (FIG. 4) is connected by lead 26 to the load terminal of counter 14, by leads 28 and 30, respectively, to the load terminal of counter 16 and K̄ terminal of flip-flop 36, and by leads 32 and 34, respectively, to the clear terminal of register 38 and the enable G terminal of register 40. AND gate 20 has a logic 0 output if any one of its inputs is logic 0, and has a logic 1 output only if all inputs are logic 1. The low active output signals the beginning of each processing interval.

The counter 16 has its enable terminal (ET) connected, by lead 42 to the load terminal of register 38, by lead 43 to the controller's step output terminal, and by lead 44 to enable terminal (ET) of counter 14. Thus, the enable terminals of counters 14 and 16 and the load terminal of register 38 are connected by lead 43 to the step output terminal of controller 13 (FIG. 3). The data in terminals of the counter 16 (FIG. 4) are connected to receive an m count from the controller 13 (FIG. 3). The m count is decremented to zero by the counter 16 (FIG. 4) to provide a pulse to the carry output terminal. The carry output of counter 16 is connected by leads 46 and 48, respectively, to an inverter 50 and enable (G) terminal of register 52. Inverter 50 is connected to the J terminal of flip-flop 36. The flip-flop has its Q terminal connected to enable terminal EP of counter 16.

Register 52 has its data in terminals connected to present address leads of bus 54 and its data out terminals connected to the B inputs of multiplexer 24. Multiplexer 24, has a binary value of 1 connected to its A inputs (FIG. 3) and multiplexes either the binary value of 1 or the memory location address obtained from register 52 into register 40 pursuant to the G terminal of register 40. AND gate 20 also receives a zero logic signal from counter 14 to signal the beginning of each processing interval to the counters 14 and 16, flip-flop 36, and registers 38 and 40.

Register 40 has its data out terminals connected to an address increment terminal 55 for the address checker 15 (FIG. 3) and to data in terminals of adder 56 (FIG. 4). The adder 56 also has data in terminals connected to the present address bus 54 and adds the next address increment to the present address. The carry output (C4) of the adder is connected to one input terminal of an OR gate 58. The data out terminals of adder 56 are connected to the A data in terminals of multiplexer 62 by bus 52 and to the input terminals of adder 68 by bus 60 and to the A inputs of comparator 70 by bus 66. A binary signal equal to m·n−1, received from the controller 13 (FIG. 3), is connected by leads 74, and 76, respectively, to the B inputs of comparator 70 and inverters 78. Inverters 78 invert the polarity of the m·n−1 signal. The inverted signals of inverters 78 are connected to the adder 68. The carry in terminal of comparator 68 is connected to a logic 1 signal. The adder 68 adds the PA+AI signal of register 56 with the two's complement of the m·n−1 signal and outputs a modified next address (memory wrap around) to the B terminals of multiplexer 62. While the comparator 70 compares the PA+AI (calculated next address) signal with the m·n−1 (end address) signal and if greater provides a logic one signal to OR gate 58. Upon receipt of a logic one signal, OR gate 58 outputs a switching signal to the S terminal of multiplexer 62 and selects the outputs of adder 68, attached to the B input terminals of multiplexer 62, for the inputs to register 38.

The present address (PA) outputs of register 38 are then applied to the appropriate leads of bus 54 to sequence the data out of the memory in the output order and write it in in the input order. A clock not shown has its output connected to the clock input terminals of counters 14 and 16, flip-flop 36, registers 38, 40 and 52, and controller 13.

In operation, the controller 13 provides: a clear signal to AND gate 20 and multiplexer 24; step (enable) signals to counters 14 and 16 and step (load) signals to register 38; a m·n−1 count signal to counter 14, comparator 70 and adder 68 (the latter through inverter 78); a m count equal to the number of range bins, which in our example is two, to counter 16 and write enable signals to the memory 10. Thus, at start up a clear signal is applied to AND gate 20 and multiplexer 24. Upon receipt of the clear signal, the AND gate 20 produces a load signal for counters 14 and 16 and the value of m·n−1 (5 of our example) is entered into counter 14 while the value of m is entered into counter 16. The clear signal causes the binary value of 1 signal input terminal A selected by the multiplexer 24 to be loaded into the register 40. This causes the initial value of the address increment to be one. The clear signal causes a present address of zero by clearing register 38, and initializes flip-flop 36 to enable counter 16. Present address is applied to the memory 10 and adder 56 by the output of register 38. The next address is calculated and presented to the inputs of register 38. When data from the present PI is available at the memory 10 input, data is read out of the addressed memory and a write enable strobe is issued to the memory which writes the data into the addressed location. A step command is then issued to load the calculated next address into register 38. This procedure is repeated for each set of data in the PI. Addressing begins at PA=SA and ends at PA=SA+m·n−1.

Upon receipt of the start signal from AND gate 20, the value of m is loaded into counter 16 and decremented at each step command to zero. This provides the data memory location for use during the next PI. As the DFL 12 data memory location is always m+1, the counter 16 is loaded with the m count which in our example is 2 and the count decremented down to zero. At the zero count, the DFL 12 address (SA+2, $010_2$) is loaded into the register 52 in response to the carry signal applied to the enable terminal of register 52. The carry signal is also applied through inverter 50 to the J terminal of flip-flop 36. Flip-flop 36 upon receipt of the signal generates a disabling signal for the counter 16 for the remainder of the addresses for this PI. The register 52 holds the address of the input data 12 write location (AI for next PI) for the next processing interval. At the beginning of the next AI (SA+2($010_2$)) in register 52 is selected by start signal from AND gate 20. Counter 16 also receives this start signal and loads count 2 (m) again to locate the DFL 12 write location for the third processing interval address increment, which is four ($100_2$) and latch it into register 52. During the second PI, the $010_2$ address increment contained in register 40 is applied to address increment output terminal 55 for an address sequence checking circuit hereinafter described and to adder 56. Adder 56 after the SA, which is always in the 0 location, adds the $010_2$ increment to each present address signal and the comparator 70 and adder 68 determine whether the sum of the PA and address increment (calculated next address) exceeds the m·n−1 value (memory end address). As the next two present addresses SA+2 and SA+4 for the second PI are located, respectively, at 2($010_2$) and 4($100_2$), found by adding $000_2+010_2=010_2$ (2), and $010_2+010_2=100_2(4)$, switching signals are not received from the OR gate 58 and the multiplexer 62 inputs the PA+AI ($010_2$, $100_2$) values to register 38 where upon receipt of the next step pulses they are sequentially applied to the appropriate leads of bus 54 and data to DFL 21 and DFL 12 area locations, respectively, are entered into the second and fourth positions of the memory. During the next step (3) of the second PI, the increment $010_2$ (2) is added to the present address $100_2$ (4) and a $110_2$ (6) is applied to comparator 70 and to adder 68. Adder 68 subtracts m·n−1(101$_2$) (5) from the PA+AI (110$_2$) (6) value and provides a difference value (wrap around address) 001$_2$ (1) at its output. At the same time, the comparator 70 is comparing the (calculated next address) (PA+AI 110$_2$ (6)) value to the memory end address (m·n−1.101$_2$(5)) value and as the calculated next address (PA+AI) value is greater its outputs a logic 1 signal to OR gate 58. OR gate 58 is activated by the logic 1 input to switch the multiplexer 62 to its B data in terminals connected to adder 68 and the wrap around address 001$_1$(1) of adder 68 is applied to the inputs of register 38. During the last two steps of the second PI, the 011$_2$ (3) and 101$_2$ (5) positions do not exceed m·n−1 and the multiplexer 62 A data terminals are utilized for selecting the calculated next addresses. The process is continued until the addresses for processing intervals 3 and 4, incremented by 100$_2$ (4) and 011$_2$ (3), have been processed; at which time an increment by 1 step is repeated. It will be noted that the other input of OR gate 58 is attached to terminal C4 of adder 56. Adder 56 provides a logic 1 through carry out terminal (C4) to the OR gate 58 anytime the calculated next address exceeds the number of bits in the internal data busses to select the wrap around address.

Figure 5:
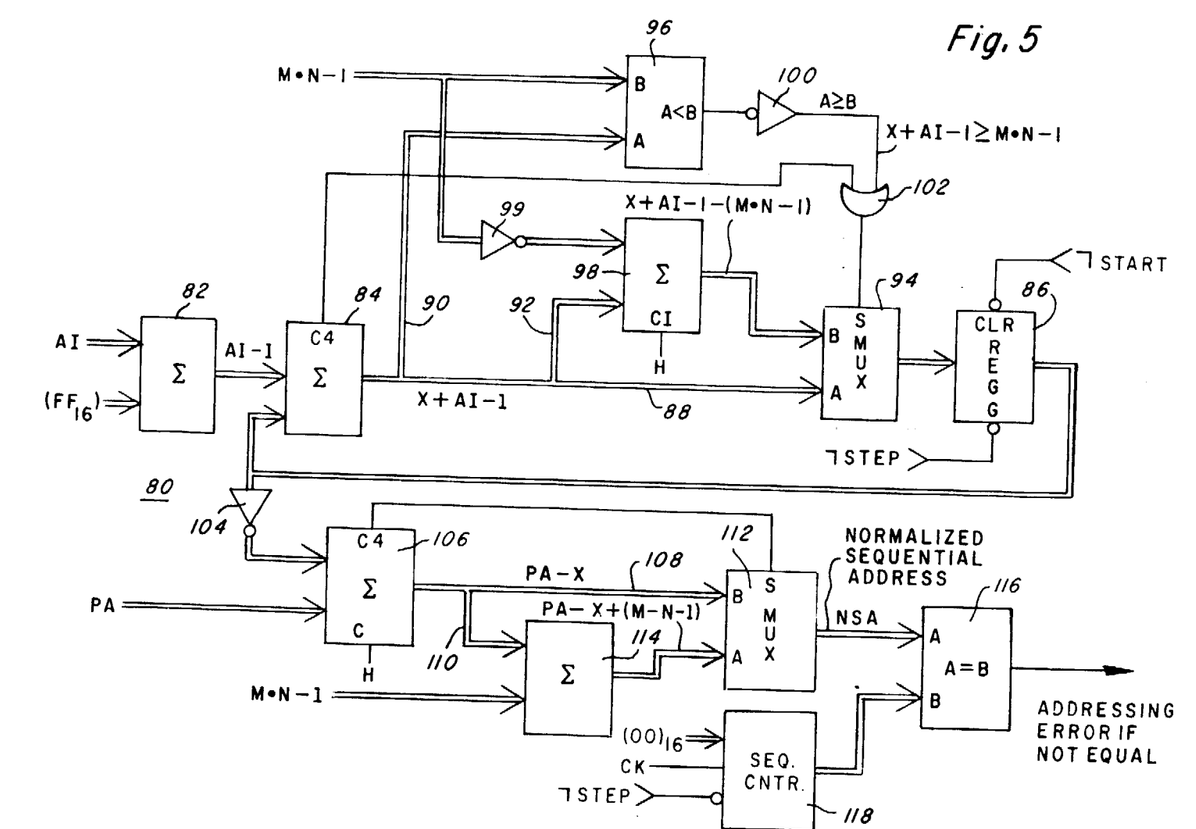
FIG. 5 is a block diagram of an address checker.

Referring now to FIG. 5, an address sequence checker 15 has an adder 82 connected to the address increment (AI) output terminal 55 (FIG. 4) and to a signal equal to 1111 1111$_2$ (2's complements of minus 1). The output of adder 82 is AI−1 and the output is connected to an adder 82 where it is summed with the feedback output X of register 86. The X+AI−1 output of adder 84 is connected to the junction of leads 88, 90, and 92. The adder 84 is connected by lead 88 to the A input of multiplexer 94, by lead 90 to the A inputs of a comparator 96, and by lead 92 to an adder 98. Comparator 96 and adder 98 have their other input terminals connected to receive from the controller a signal equal to the count m·n−1. The m·n−1 input to adder 98 is inverted by an inverter 99. The output of adder 98 is equal to X+AI−1−(m·n−1) and the output of the comparator 96 is logic 0 if X+AI−1 is greater than or equal to m·n−1. This logic zero is applied to an inverter 100 which inverts it to a logic 1 signal. The logic 1 signal is applied to OR gate 102 which applies a switching signal to the S terminal of multiplexer 94 and the multiplexer switches to receive the X+AI−1−(m·n−1) value from adder 98. Register 86 has its enable (G) terminal connected to receive the step signals generated by the controller and loads therein the X+XAI−1−(m·n−1) output of the adder 98. Where the X+AI−1 signal is less than m·n−1 a logic 1 is the output signal of comparator 86. The logic 1 signal is inverted by inverter 100 and applied to OR gate 102. The zero output of OR gate 102 is applied to the switching terminal of the multiplexer 94 which selects the inputs A (X+AI−1) of multiplexer 94 as the inputs to register 86.

The X output of register 86 is also applied to inverters 104 which apply the inverted X value to one input terminal of an adder 106. The other input of adder 106 is connected to the present address (PA) output of register 38 (FIG. 4) of the address sequence mechanism. The output (PA−X) of adder 106 (FIG. 5) is connected to the junction of leads 108 and 110. Adder 106 is connected by lead 108 to the B terminals of a multiplexer 112 and by lead 110 to input terminals of adder 114. The other input terminal of adder 114 is connected to the m·n−1 output of the controller. The output [(PA−X+(m·n−1)] of adder 114 is connected to the A input terminals of multiplexer 112. The output of multiplexer 112 is controlled by the carry out (C4) terminal output of adder 106; either the normalized sequential address signals PA−X of the B inputs or the PA−X+(m·n−1) of the A inputs are applied to the A terminals of comparator 116. The B input terminals of comparator 116 are connected to the sequence numbers (0→m·n−1) generated by sequence counter 118 and an addressing error signal is generated if the A and B inputs of the comparator 116 are not equal.

Although only a single embodiment of the invention has been described herein, it will be apparent to a person skilled in the art that various modifications to the details of construction shown and described may be made without departing from the scope of this invention.

What is claimed is:
1. A signal processor comprising:
 (a) a memory having a capacity for storing data for a preselected processing interval (PI);
 (b) an address sequencing mechanism connected to the memory, said address sequencing mechanism producing addresses in accordance with the following address equation:
 $ADD_{K+1} + ADD_K + AI_J$
 but if $ADD_K + AI_J > SA + m·n − 1$;
 then $ADD_{K+1} = ADD_K + AI − (m·n − 1)$
 where: $ADD_K$=present address, $ADD_{K+1}$=calculated next address, SA=memory start address, m=number of columns, n=number of rows, $AI_J$ =address increment for the present PI and $AI_{J+1}$=addressing increment for the next PI; said addresses for continuously reading out of the memory the data for the preceding interval in a data out order while continuously overwriting data, in a data in order, for the next processing interval into the memory locations from which the data was read out, each of said addresses for the first processing interval incremented by one and thereafter each address for each subsequent processing interval incremented in accordance with the formula:

$$AI = PAI · m(\text{integer of } PAI·m/m·n − 1)·(m·n − 1)$$

where: AI is the address increment for each address of the next processing interval, PAI is the address increment of the present processing interval, and m and n are, respectively, the preselected number of columns and rows in the data format for the memory; and
 (c) a controller operatively connected to the address sequencing mechanism and memory for providing selected control signals thereto.

2. A signal processor according to claim 1 further including an address sequence checking mechanism operatively connected to the address sequencing mechanism and controller for detecting errors in the addresses outputted by the address sequencing mechanism.

3. A signal processor according to claim 2 wherein the address sequence checking mechanism comprises a first circuit including a sequence counter for generating addresses consecutively from 0 through m·n−1, and a second circuit for converting the present addresses of the address sequencing mechanism to consecutive addresses synchronously with the addresses of the first circuit, and a comparator connected to the address outputs of the first and second circuits for comparing the consecutive addresses and indicating any errors.

4. A signal processor according to claim 3 wherein the second circuit includes a first adder 82 connected to the address sequencing mechanism and controller for combining an address increment (AI) signal of the address sequencing mechanism with a two's complements minus 1 signal of the controller, a second adder 84 having an input terminal connected to the first adder for combining the output signal (AI−1) of the first adder with a selected feedback signal (X) of the second circuit, a third adder 98, comparator 96 and first multiplexer 94 connected to the second adder for receiving the output signal (X+AI−1) of the second adder, the third adder and comparator also connected to the controller 13 for receiving the m·n−1 signal of the controller, the third adder for providing a difference signal (X+AI−1)−(m·n−1) at its output and the comparator for comparing the second adder's output signal (X+AI−1) with the m·n−1 signal for generating a pulse when the second adder's signal (X+AI−1) is equal to or greater than the m·n−1 signal, a logic gate having an input connected to the first comparator 96 for providing a switching pulse at its output in response to the output of the comparator, said first multiplexer also connected to the output terminals of the third adder 98 and operative in response to the logic gate to provide, selectively at its output the third adder's (X+AI−1)−(m·n−1) signal and the second adder's (X+AI−1) signal as the feedback signal X of the second adder, a register 86 connected the output terminal of the first multiplexer 94 for outputting the signals (X) of the first multiplexer 94 in response to an address load signal of the address sequencing mechanism and step signals of the controller, a fourth adder 106 having input terminals connected to the register and to the address sequencing mechanism for receiving the present address outputs of the address sequencing mechanism for producing an output signal (PA−X), a fifth adder 114 and a second multiplexer 112 having input terminals connected to the output terminals of the fourth adder 106, the fifth adder 114 also having input terminals connected to the controller 13 for receiving the (m·n−1) output signals of the controller, the second multiplexer 112 also having input terminals connected to the output terminals of the fifth adder 114 for receiving the PA−X+(m·n−1) signal and a switching terminal connected to the fourth adder's output enable terminal for outputting, selectively, the fourth adder's output signal (PA−X) and fifth adder's output signal PA−X+(m·n−1) to the sequence address comprising comparator.

5. A signal processor according to claim 1 wherein the control signals produced by the controller connected to the address sequencing mechanism comprise clear signals and m·n−1 step pulses for signaling the beginning of a data processing interval in the address sequencing mechanism, and an m count for selectively enabling the address sequencing mechanism for providing the address increment for each processing interval after the first for the data memory location addresses.

6. A signal processor according to claim 1 wherein the address sequencing mechanism includes first and second counters 14, 16, said first counter connected to the controller and operative in response to selected controller signals for producing a load start address enabling signal for each processing interval, and said second counter 16 connected to the controller and operative in response to the load start address enabling signal and selective controller signals for producing an enable signal at a preselected count, a present address bus 54 interconnecting the memory and a register means, said register means including a first register 52 connected to the present address bus for receiving the memory addresses of each processing interval and to the second counter for receiving the enabling pulse for selectively latching a preselected address in the register in response to the enabling pulse for use during the next processing interval, a multiplexer 24 connected to the first register and to the controller 13 for selectively receiving the latched present address and a binary one count output of the controller 13, a second register 40 connected to the multiplexer for holding the selected output of the multiplexer, a first adder 56 connected to the present address bus 54 and a second register 40 for combining the present address of the present address bus 54 with the address increment contained in the second register 40, address modifying means for selectively modifying the next address of adder 56 for any row wrap around, and an output register 38 connected, selectively, to the output of the address modifying means and first adder 56 for holding the memory sequence addresses for the bus line 54 for sequencing the data out of the memory locations in the output order and writing new data into those memory locations in the input order.

7. A signal processor according to claim 6 wherein the address modifying means for determining any wrap around row addresses includes an adder 68 and a comparator 70, said comparator 70 connected to the controller for receiving the memory and address (m·n−1) count and to the second adder 56 for receiving the next address and comparing it with the memory end address (m·n−1) to determine any exceedance, and said adder 68 connected to the controller for receiving the memory end address and to the adder 56 for receiving the next address for subtracting the memory end address (m·n−1) from the next address for determining wrap around address, and OR gate connected to the comparator 70 and to the first adder 56 and a multiplexer 62, said OR gate connected to multiplexer 62 and operative in response to the comparator and adder outputs for controlling the multiplexer to multiplex, selectively, the wrap around address for the next address and the next address, said multiplexer connected to the output register 38 which holds the output of the multiplexer.

8. A signal processor according to claim 6 wherein the preselected count of the second counter is m+1 where m is the number of columns in the organization of the data processed.

* * * * *